Patented Nov. 18, 1947

2,431,202

UNITED STATES PATENT OFFICE 2,431,202

SELF-DISPERSING METHYLOLSTEAR-AMIDES

Herbert L. Sanders, Easton, Pa., assignor to General Aniline & Film Corporation, New York, N. Y., a corporation of Delaware No Drawing. Application March 1, 1945, Serial No. 580,499

2 Claims. (Cl. 252—8.8)

My invention relates to dry, solid N-monomethylol derivatives of higher aliphatic compounds which are self-dispersing or self-emulsifying in water. More particularly, my invention relates to dry, solid N-mono-methylol amides of higher fatty acids which are self-dispersing or self-emulsifying in water to give emulsions of any desired concentration, and to their method of preparation.

In United States Patent No. 2,211,976, granted to Hubert et al., and in No. 2,306,185, granted to Joseph Pikl, there are disclosed methylolamide compounds having the following structural formula:

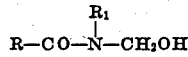

wherein R and $R_1$ have the significance defined in the patents. These methylolamides are disclosed as suitable for rendering textile materials water-repellent or hydrophobic. Because of the insolubility of the methylolamides in water, they are applied to textile materials as solutions in organic solvents or in the form of aqueous emulsions.

The aqueous emulsions, it has been found, tend to stiffen on storage, thereby introducing handling difficulties. Extremes of temperature may also break the emulsions. Furthermore, the presence of the large amount of water in such emulsions, since they contain only a small amount of the methylolamide compound, increases shipping costs.

I have now found that such methylolamides which come under the formula of the above-mentioned patents and which are solid at ordinary temperatures (about 25° C.) and relatively water-insoluble can be produced in the form of dry, solid compositions comprising small particles, which can be stored indefinitely without change and yet will disperse smoothly and easily in warm water to give an emulsion of any desired concentration. Tests show that my novel product is fully equal in its water-repellency producing properties to the emulsion type heretofore used. Furthermore, the process of manufacturing such a dry, solid, self-dispersing methylolamide is much simpler and cheaper when compared with preparing the prior emulsions, since the preparation of such emulsions requires elaborate emulsifying equipment and the addition of various agents which are made unnecessary by my novel product.

The new dry, solid, self-emulsifying form or methylolamides which is the subject of my invention may be, in general, prepared by dissolving in a melt of the methylolamide a suitable agent or mixture of agents which act as dispersing agents for the methylolamide. On cooling the melt, solidification results and the solid product obtained may be broken into small fragments or flakes, or ground to a powder.

The resulting product is self-dispersing or emulsifying when added to water. Any concentration of emulsion may be obtained depending on the amount of the product which is added to the water. The resulting emulsion can then be applied to textile material in any suitable manner, such as by padding. The padded cloth is dried and then heated at an elevated temperature to impart water-repellency properties thereto. If desired, various products which enhance the water-proofing effect, like lactic or glycolic acid or their alkali metal salts, can be included within the dry product during its manufacture, thus eliminating the addition of such compounds to the heretofore known emulsions, a step which previously was required of the consumer. In prior practice where the emulsion used was a highly concentrated one, the addition of such compounds could not be effected since they cause breaking of the emulsion.

The following examples illustrate my process and composition, but it is to be understood that my invention is not limited thereto.

Example 1

100 grams of methylolstearamide is prepared by melting together 89 grams of stearamide and 11 grams of paraformaldehyde, and the melt is maintained at 130° C. for five minutes. The melt is then cooled to 115° C. and the following mixture of dispersing agents is added thereto: 6 grams of an alkylated sodium benzene sulfonate which is sold under the name "Ultrawet A" by the Atlantic Refining Company, of Philadelphia, Pennsylvania; 10 grams of the reaction product of ethylene oxide and oleyl alcohol; and 5 grams of sodium sulfonate of ethyl oleate. The melt is then stirred at 115° C. until these agents dissolve and is then solidified by permitting it to cool to room temperature. This may be done by pouring out the melt in a suitable shallow pan. Finally the solid material obtained is broken into small fragments, as for example, by grinding. The smaller the fragments, the more readily the product will self-emulsify in aqueous solutions. It has been found that a product ground to a 10 mesh is highly satisfactory for quickly making emulsions. The final product made according to the above procedure contains 83% of active ingredient. By "active ingredient" is meant water-repellency producing ingredient. To make a 3% emulsion of this material, based on the active ingredient, which is an emulsion strength suitable for waterproofing, the following procedure may be used:

10 grams of the ground self-emulsifying material, containing 8.3 grams of active ingredient, are added to 75 cc. of water at 95° C. while stirring at a moderate speed either by a mechanical stirrer or by hand. The temperature is maintained at 95° C. for several minutes until the methylolamide product has all melted. On cooling below 85° C., the product resolidifies in the form of a 10% white dispersion. At this point 193 cc. of water at room temperature are added and 3% emulsion or dispersion results.

Fabrics of various kinds may be waterproofed by this emulsion by the following procedure: To the emulsion there is added 1.2% of glycollic acid and 0.15% of sodium hydroxide based on the emulsion weight. A poplin cloth is padded through this, dried, then baked five minutes at 135° C. to fix the methylolstearamide to the fabric. Finally the residual acid is washed out and the cloth ironed.

The treated fabric is evaluated for repellency in accordance with the A. A. T. C. spray test which is described on pages 236–238 of the 1943 Year Book of the American Association of Textile Chemists and Colorists, vol. XX. In general, in this test the fabric is drawn taut on a hoop and then sprayed with 250 cc. of water through a shower nozzle. The degree of wetting is judged visually and graded, starting with 100 as no wetting at all, and so on down to 50 which indicated fairly complete wetting. The product of this example gives a water-repellency of 100.

Instead of adding the glycollic acid and sodium hydroxide to the emulsion, an alkali metal glycollate, such as sodium glycollate or other products which enhance the waterproofing effect, such as lactic acid or sodium lactate, may be incorporated in the methylolstearamide melt together with the dispersing agent, so that the step of adding these compounds to the emulsion is eliminated by the consumer.

*Example 2*

100 grams of methylolstearamide is prepared as in Example 1. The melt is then cooled to 115° C. and there is then added thereto 10 grams of dioctyl sodium sulfosuccinate as the dispersing agent. The remainder of the procedure is then the same as in Example 1. A dry, solid product which is self-dispersible in water and contains 91% of active ingredient is obtained. Emulsions suitable for waterproofing can be obtained as in Example 1 and were found, when applied to textile materials, to give spray tests of 100.

*Example 3*

100 grams of methylolcaprylamide was prepared according to the procedure of Example 1 using amounts of caprylamide and paraformaldehyde to give the desired amount of methylolcaprylamide. To the melt was then added 10 grams of dihexyl sodium sulfosuccinate as the dispersing agent and the melt was permitted to cool at room temperature until it solidified. The final product obtained was ground into small fragments and was found to be self-dispersible in water. An emulsion formed therefrom by simply stirring the solid product in warm water was found to render textile materials highly water-repellent.

*Example 4*

The procedure was the same as in Example 1 except for stearamide there was substituted lauric acid amide and to the melt of lauric acid methylolamide formed there was added 10 grams of the sodium sulfonate of ethyl oleate as the surface-active dispersing agent. The melt was permitted to solidify at room temperature and was found to be self-dispersing when added to water. The emulsion formed was highly effective in rendering textile materials water-repellent.

Instead of adding the dispersing agents to the melt of the methylolamide, as in the above examples, to form the self-dispersible, dry, solid product, a similar product may also be made by adding the melted methylolstearamide to water with rapid agitation, forming a cheese-like mass, then flushing most of the water out with a suitable organic liquid and finally kneading into the mass a suitable dispersing agent and then drying. The following is an example of this procedure.

*Example 5*

100 grams of methylolstearamide is prepared as in Example 1 by melting together 89 grams of stearamide and 11 grams of paraformaldehyde and maintaining the melt at 130° C. for five minutes. The melt then cooled to 115° C. was poured into 325 cc. of water at 82° C., while stirring very rapidly. A cheesy paste resulted. Upon addition of 45 cc. of a 1:1 solution of pine oil and turpentine to this paste, 150 cc. of water could be flushed out or removed. Into this flushed-out product there was worked by suitable mixing 6 grams of "Ultrawet A" and 10 grams of the reaction product of ethylene oxide with oleyl alcohol to make a smooth paste. When dried at 40° C., the final product was solid and contained about 75% of active ingredient.

The dry, solid product could readily be made up into a 5% emulsion by simply stirring it in warm water. The emulsion obtained was found to have a good stability. Applied to textile materials, it rendered them water-repellent, giving a spray value of 100.

Instead of methylolstearamide, methylolcaprylamide, and methylol lauric acid amide in any of the foregoing examples, other higher fatty acid amides may be employed. In general, I have found that such methylolamides which come under the formula of the above-mentioned patents and which are solid at ordinary temperature, namely, about 25° C. and are relatively water-insoluble, can be converted into dry, solid, self-dispersible products. Such methylolamides are generally suitable where R in the above formula stands for an aliphatic radical containing at least 7 carbon atoms, and $R_1$ stands for hydrogen or an alkyl radical, or an alkylene radical carrying another methylolamide group. For instance, the methylolamides derived from oleic acid, palmitic acid, and fatty acids of coconut oil, palm oil, cottonseed oil, or tallow, or such fatty acids derived from hydrogenated fats are suitable. Also found to be suitable are the methylolamides of montanic acid, p-dodecyl-phenyl butyric acid, dodecyclohexyl butyric acid, iso-octyl phenoxy acid, abietic acid, decanoic acid, and undecanoic acid. Examples of other compounds falling under the general formula which can be rendered self-emulsifiable by my invention are N-methylstearamido-methanol, N,N' - methylene - bis-(octadecyl-carbamido-methanol), and N,N'-methylene-bis (stearamido-methanol). By the term "methylolamide of a higher fatty acid," I intend to include compounds of the type mentioned above.

The dispersing agents mentioned in the examples are only by way of illustration. In general, any agent which dissolves in the molten methylolamide compound and permits it to solidify into a dry product which is self-dispersible in water, may be used as the dispersing agent. Dispersing agents which I have found particularly effective are various surface-active or surface-tension reducing agents.

Instead of adding the dispersing agents to the melt of methylolamide compound formed in situ, these agents may be added to preformed molten methylolamides.

Instead of the surface-active dispersing agents mentioned in the aforesaid examples, there may also be used "Duponol WA" and "Duponol ME" which are sulfates of high alkyls, sold by the E. I. Dupont Company; lauryl sulfoacetates; 7-ethyl-2-methyl undecenol-4-sodium sulfate; "Avitone A" which is a sodium hydrocarbon sulfonate and is sold by the E. I. Dupont Company; "Emulgor L," a product sold by the Glyco Company; and "Emulsept 607M," which is a quaternary ammonium derivative of pyridine, a product sold by the Emulsol Corporation.

It has been found that certain mixtures of the surface-active dispersing agents can also be used to produce the solid, dry, self-dispersing methylolamides. Instead of the mixture mentioned in Example 1, there may be also used a mixture of "Ultrawet A" and the reaction product of ethylene oxide and oleyl alcohol, and the mixture of dioctyl sodium sulfosuccinate and the reaction product of ethylene oxide and oleyl alcohol.

In general, the amount of dispersing agent added to the methylolamide may range from that just sufficient to produce self-dispersing properties in the dry, solid product to as high as 20% or more. The most suitable range of concentration has been found to be from 5 to 10%. Generally, the larger the amount of dispersing agent present, the greater is the self-dispersibility of the final product.

It has been found that not all surface-active agents are equally effective in producing self-emulsifying solid methylolamides, nor all mixtures of such surface-active dispersing agents. Thus, diamyl sodium sulfosuccinate, alkylated sodium benzene sulfonate, isobutyl naphthalene sodium sulfonate, or the reaction product of ethylene oxide and oleyl alcohol alone; a mixture of the reaction product of ethylene oxide with oleyl alcohol and sodium sulfonate of ethyl oleate, or a mixture of "Ultrawet A" and sodium sulfonate of ethyl oleate were found ineffective to impart self-emulsifying properties to the methylolamides when used in amounts as high as 10 percent.

However, all agents which dissolve in the molten methylolamide and permit it to solidify into a dry product, which is self-dispersible in water, are suited for my purpose. I do not, accordingly, wish to be limited to any specific dispersing agent but desire to include all those which have these properties.

I claim:

1. A method of producing a dry, solid, self-dispersing methylolstearamide which comprises adding the melted methylolamide to water with rapid agitation to form a cheese-like mass, flushing the water out of the mass with a pine oil-turpentine solution, then kneading into the mass a sufficient amount of a surface-active dispersing agent which renders the mass dispersible in water, and then drying the mass.

2. A method of producing a dry, solid, self-dispersing methylolstearamide which comprises adding the methylolstearamide to water with rapid agitation to form a cheese-like mass, flushing the water out of the mass with a pine oil-turpentine solution, then kneading into the mass a sufficient amount of a mixture of an alkylated sodium benzene sulfonate and the reaction product of ethylene oxide and oleyl alcohol to render the mass dispersible in water, and then drying the mass.

HERBERT L. SANDERS.

REFERENCES CITED

The following references are of record in the file of this patent:

UNITED STATES PATENTS

| Number | Name | Date |
|---|---|---|
| 2,284,023 | Scripture | May 26, 1942 |
| 2,211,976 | Hubert | Aug. 20, 1940 |
| 2,306,185 | Pikl | Dec. 22, 1942 |
| 2,358,871 | Maxwell | Sept. 26, 1944 |

FOREIGN PATENTS

| Number | Country | Date |
|---|---|---|
| 477,639 | Great Britain | Jan. 4, 1938 |

OTHER REFERENCES

Mattiello, "Protective and Decorative Coatings," vol. IV, pages 350–356.